July 13, 1943.　　　　N. C. PRICE　　　　2,324,236
BLOWER AUTOMATIC THROTTLE
Filed June 10, 1939
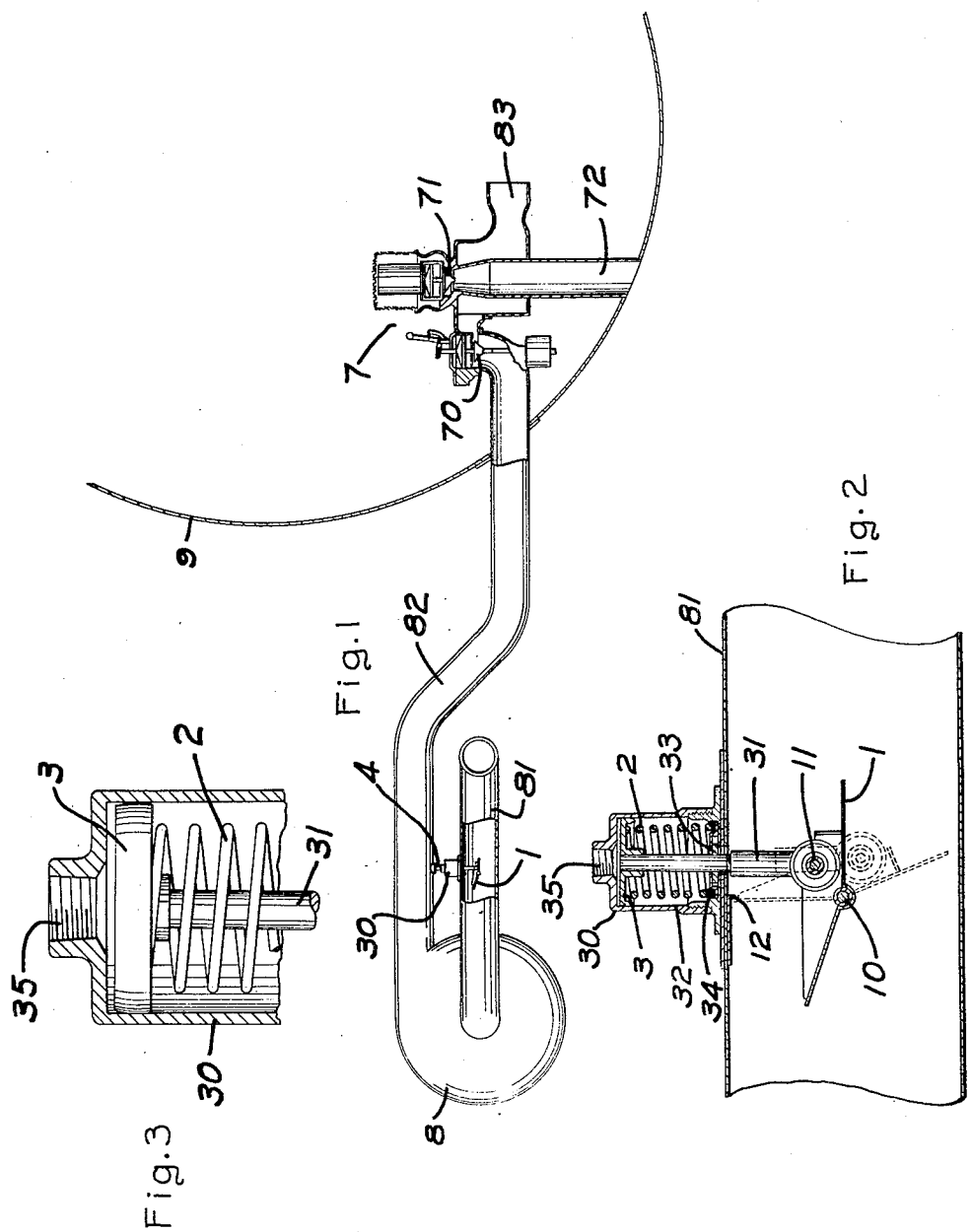
Inventor
Nathan C. Price
By Charles L. Reynolds
Attorney Patented July 13, 1943

2,324,236

UNITED STATES PATENT OFFICE 2,324,236

BLOWER AUTOMATIC THROTTLE

Nathan C. Price, Seattle, Wash., assignor, by mesne assignments, to Boeing Aircraft Company, Seattle, Wash., a corporation of Washington Application June 10, 1939, Serial No. 278,523

11 Claims. (Cl. 128—204)

A blower is employed in maintaining the pressure within an aircraft cabin at a desirable pressure density, above atmospheric, at high altitudes. Such a blower, or the air discharged therefrom, is regulated by a more or less complicated automatic or semi-automatic device controlling the amount of air admitted to the cabin and the amount discharged therefrom to maintain the proper pressure level, in accordance with atmospheric conditions and altitude. Arrangements to this end are disclosed in detail in my Patent No. 2,208,554 issued July 16, 1940, and in my copending application, Serial No. 216,028, filed June 27, 1938, respectively.

It is undesirable to permit too great or too rapid development of differences of pressure between the intake to and the discharge from the blower. For instance, it is intended in such cabin supercharging systems as are disclosed in my patent and copending application referred to above, to have the blower directly connected to a propelling engine of the airplane, and to have its discharge duct into the cabin throttled to produce a constant flow at altitudes below, say 8000 feet. Below this altitude such air delivered will merely be replacement air, for the cabin air pressure is equal to atmospheric, not being supercharged until a higher altitude is reached. Unless the flow is held constant by throttling, the blower will tend to pass great quantities of air, absorbing far greater power than if it were not throttled. Upon take-off at sea level, where the atmosphere has maximum density, and with the engine developing power approaching its maximum, that is to say, developing considerably more power and operating at higher speed than during cruising, it will be understood that such a blower throttled only at its discharge may well develop a very considerable difference of pressure (perhaps as much as 30 inches of mercury) as between its intake, which may or may not be under minus pressure, and its discharge duct, which is at appreciable plus pressure. This situation exists because the blower has been designed to produce a given pressure rise, 5 inches of mercury for example, at an altitude of 20,000 feet (where, because of the air's slight density, the blower must handle large quantities) and during cruising engine speed, which requires materially less power than is used at take-off. Because, then, the system must be designed to operate under high altitude conditions, it produces magnified and undesirable effects under take-off conditions, and particularly at sea level. Then, also, such pressure differences are accompanied by undesired and disadvantageous temperature effects, particularly abnormal rise of temperature in the discharge duct, which is supplying air to the cabin, caused by high compression of air in it when nearly closed off. These conditions result in excessive power consumption by the blower, and adversely affect the control mechanism which must be prepared to hold down the excessive flow tendencies by throttling the discharge, and then to resist the extreme pressure rise resulting from the throttled discharge. Sensitive controls are generally not intended to operate at such pressures. Furthermore, appreciable noise is produced in the blower discharge duct and through the control mechanism. It is the object of the present invention, then, to provide means to throttle the blower, normally the intake thereto, to limit the pressure differential as between the blower intake and the blower discharge to a selected maximum, perhaps to sixteen inches of mercury under the most extreme conditions, to the end that the differential between the blower intake and the blower discharge duct is automatically limited, that there is a lower temperature rise in the blower discharge duct, that there is less power consumption by the blower, that the automatic controls may have greater sensitivity since they are not subjected to such excessive pressure differences, and that there is less noise developed by the supercharging equipment.

It is also an object to provide mechanism of the character indicated, which shall be simple yet effective, rugged and requiring little or no attention, and which is light in weight.

With these and other objects in mind, as will appear hereafter, my invention comprises the novel parts, and the novel arrangement thereof relative to the blower intake and discharge ducts, and relative to the cabin supercharging and pressure controlling equipment.

In the accompanying drawing I have shown my invention embodied in a typical form and in a representative installation, it being understood that various changes may be made in the form, arrangement, and character of the parts, as will appear more fully hereinafter.

Figure 1 is an elevation largely diagrammatic in character, and with parts broken away, illustrating the arrangement of the throttle relative to the blower and relative to the cabin pressure automatic control mechanism.

Figure 2 is an enlarged section through the damper and its operating mechanism, which comprise the automatic throttle, shown in relation to the blower intake duct, and Figure 3 is a further enlarged axial section through the pressure cylinder, illustrating the piston which is reciprocable therein.

The cabin structure of the aircraft is indicated at 9. This structure is made air-tight, at least sufficiently so that there will be no undue leakage of air from within, though the cabin pressure may exceed the external atmospheric pressure by an appreciable amount, such as 5 inches of mercury for example. At high altitudes, air is supplied to the cabin from the external atmosphere by a blower 8 which is normally directly connected to one of the propulsive engines (not shown), whereby the blower rotor is driven at a speed corresponding to the speed of the engine. The connection of the blower 8 to a propelling engine is not, of itself, an essential element of this invention; when so connected, however, it is readily understandable that, at take-off, there will be a pressure surge, tending to create an undesirable pressure difference across the blower. Such a result may occur even when the blower is otherwise driven, or, with a direct-driven blower, at times other than at take-off.

Air is taken in from the external atmosphere by a blower intake duct 81, the entrance to which may be located in a pressure area, for instance at the leading edge of the wing. This air at high altitudes is considerably more rarefied than at sea level, and, for any given speed of the engine and blower 8, the air is less dense when delivered through the blower discharge duct 82 and into the cabin, the higher the altitude. To put it differently, at sea level, where the atmosphere is at maximum density, at a given blower speed, which is dependent upon engine speed, the air will be discharged through the duct 82 and into the cabin 9 at rather high pressure as compared to the discharge pressure with the same engine speed at high altitudes, say at 20,000 feet, for at the high altitudes the intaken air is so much less dense at sea level, and consequently at a given blower speed can only be compressed to a pressure density which is considerably lower than the pressure density to which air at sea level pressure may be condensed at the same blower speed. If, then, the blower speed is higher at sea level, for instance at take-off, then the pressure in the discharge duct 82 is even greater.

The discharge duct 82 delivers air past a cabin pressure control unit 7, having an inlet valve 70, the intermittent opening and closing action of which is controlled by rather complicated and sensitive mechanism fully described in my aforementioned Patent No. 2,208,554, and into the cabin at the exit 83. Air is discharged from the cabin past an outlet valve 71 to a cabin outlet duct 72, and the outlet valve 71 is likewise controlled by rather complicated and sensitive mechanism. This pressure control device 7 operates automatically, and being sensitive, it must be protected insofar as possible from extremes of blower discharge pressure or temperature. Likewise, at such extreme blower discharge static pressures, which are inversely variable with the velocity of flow throttled by closing movement of inlet valve 70, it is likely to become noisy and to operate unsatisfactorily, and in any event excessive temperature effects are produced, and the blower consumes an unduly large proportion of the power of the engine, whereas the engine particularly requires all available power at take-off. It is for such reasons that the automatic blower intake throttle is employed.

This throttle consists of a damper 1, pivotally mounted upon a transverse axis at 10, within the blower intake duct 81. Preferably the damper includes two portions disposed at an obtuse angle, that is, greater than a right angle and slightly less than a straight angle, so that one arm may lie parallel to the air flow, with the other arm inclined somewhat in such a way that the action of the pressure difference upon opposite sides of the damper normally tends to keep the damper open, the force thus acting being variable with the degree of pressure difference. It is also held open by yieldable means consisting of a spring 2 acting upon an element 3 in the form of a piston reciprocable within a casing or cylinder 30, and connected by a stem 31, adjustable in length, to the damper 1. The connection may be by means of an antifriction bearing at 11, offset from the pivotal mounting 10 of the damper. The action of the spring 2 urges the piston 3 and its stem 31 upwardly, thereby tending to hold the damper open.

The cylinder 30, at its lower end, is vented, as indicated at 32, to avoid entrapment of air as the piston tends to move downwardly in a direction to close the damper, yet the vents are sufficiently small so that a dash pot action results if the pressure builds up too rapidly. Provisions are also made in the arrangement of the piston and its connection to the damper to accommodate and permit oscillating movement of the piston, which need only be slight. Thus as seen in Figure 3 the skirt of the piston is rather short axially, and is rounded so that the piston may oscillate. It need hold only slight pressure, hence a reasonably close fit over a short distance will suffice. Also, as is seen in Figure 2, the cylinder 30 is mounted directly upon the blower intake duct 81, and a hole is formed for the accommodation of the stem 31, which hole is larger than the stem, but which is closed by a washer 33 which is slidably held in a cage 34. In this manner the piston 3 and its stem 31 may oscillate, as required by its direct connection to the pivoted damper, yet no undue leakage, either into the duct 81 or past the piston 3, will result.

The cylinder 30 is connected by a short length of tubing 4, fitted to the cylinder at 35, to the blower discharge duct 82, leading to the cabin and to the pressure control apparatus 7. The ducts 81 and 82 may in this portion parallel each other, though that, of course, is not an essential, since the connecting tube 4 may take any form desired.

Pressure in the blower discharge duct 82, which builds up as valve 70 moves toward closed position to restrict the duct and throttle the blower's output, is, by the connection 4, communicated to the cylinder 30 and to the upper face of the piston 3. The force resisting the tendency of such pressure to close the damper is the spring 2, which may be adjusted, by the use of shims or in any suitable way, to supply the desired amount of resistance. Once this limit of resistance is overcome by the pressure acting upon the upper face of the piston 3 the piston tends to move downwardly and the damper 1 is thereby moved towards closed position. This result occurs whenever the pressure in the blower discharge duct 82 exceeds the value for which the spring 2 has been set, which value may be, for example, five inches of mercury, or perhaps three pounds per square inch difference of pressure between the external atmosphere, acting on the under side of the piston, through the vent ports 32, and the blower discharge pressure acting upon the upper side of the piston through the duct 82 and the connection 4. Thus the damper may be set to close substantially wholly at some such selected difference of pressure, though preferably it does not close altogether as is shown by the dotted line showing in Figure 2, and in this manner an excessive difference in pressure in the duct 82 over the atmospheric pressure and over the suction in the blower intake duct 81 is prevented. The stop flange 12, in position to engage the damper 1 in the closed limit of its movement, prevents the damper going beyond the dotted line or "fully closed" position.

During closure or partial closure of the damper 1 the supercharger operates in a partial vacuum. relative to atmospheric pressure, and under such condition of operation in the less dense medium is caused to do less work upon the air passing through it.

It has been found during test of one pressure cabin aircraft under take-off conditions that the pressure rise in the blower could be reduced from 30 down to approximately 16 inches of mercury by installing the apparatus of the invention, and this 16 inches over-all pressure rise was composed of 10 inches depression at the blower inlet plus 6 inches plus pressure at the blower outlet.

What I claim as my invention is:

1. Control mechanism for a blower having an intake thereto and a discharge duct therefrom, comprising means to control the amount of air admitted to the blower, means in the discharge duct operable to reduce the velocity of air flowing out through it and consequently tending to increase the static pressure therein, and means operable automatically under the influence of an increase in pressure in the discharge duct caused by such decrease in flow velocity therethrough to operate said control means to lessen the amount of air admitted to the blower, thereby in turn to reduce the degree of static pressure increase in the discharge duct from that which would normally be induced by such decrease in flow velocity.

2. Control mechanism for a blower having an intake thereto and a discharge duct therefrom, comprising means to vary the size of the intake, means to throttle the blower output, and means operable under the influence of static pressure in the discharge duct, inversely variable with the velocity of flow therethrough, to govern the first means, to decrease the intake automatically in accordance with increase of pressure in the discharge duct induced by the throttling of said second means and the consequent decrease in the velocity of discharge duct flow, whereby to maintain a substantially constant differential of blower delivery pressure over blower intake pressure.

3. Control mechanism for a blower having an intake thereto and a discharge duct therefrom, comprising a damper in the intake movable to control the amount of air admitted to the blower, means operable to restrict the discharge duct and thereby to substantially throttle the blower's output, and correspondingly to increase the pressure in such discharge duct, and means sensitive to such pressure increases in such discharge duct intermediate the blower and said restrictive means, operable by increase of pressure in such portion of the discharge duct above a selected maximum to move said damper towards closed position.

4. In a system for control of pressure within an aircraft cabin, a blower driven by an aircraft propelling engine, a delivery duct from said blower communicating with the aircraft cabin for delivering thereto air under pressure, control means for said delivery duct operable to restrict the flow of air through such duct and thereby to substantially throttle the blower's output, an intake duct to said blower, a damper in said intake duct operable to restrict flow therethrough, and pressure responsive, damper operating means responsive to and controlled by the pressure in that portion of said delivery duct intermediate said blower and said control means, for controlling said damper to vary the restriction in said intake duct effected thereby.

5. Control mechanism for a blower having an inlet duct, comprising a delivery duct delivering the entire blower output at all times, means in the delivery duct operable to substantially close such duct, thereby greatly increasing the pressure therein, a damper in the inlet duct operable to restrict flow therethrough, pressure responsive, damper operating means for controlling said damper to vary the restriction in said intake duct effected thereby, and a duct connected to that portion of the blower delivery duct intermediate the blower and said first means and communicating with said pressure responsive, damper operating means, for controlling said damper operating means in response to pressure variation in such portion of the blower delivery duct.

6. In a system for control of pressure within an aircraft cabin, a blower, an intake duct to said blower from atmosphere, a delivery duct to the cabin, means to restrict said delivery duct in governing the cabin pressure, and thereby to substantially throttle the blower output, and means operable under the influence of a pressure differential between said intake duct and that portion of said delivery duct intermediate said blower and said restrictive means in excess of a predetermined differential, to decrease the intake to the blower, thereby to lessen the aforesaid differential.

7. In a system for control of pressure within an aircraft cabin, a blower, an intake duct to said blower from atmosphere, a delivery duct conducting the entire blower output at all times to the cabin, means to restrict said delivery duct in governing the cabin pressure, spring-loaded pressure sensitive means operatively connected to be subject to the pressure in that portion of the delivery duct intermediate said blower and said restrictive means, and to be moved in opposition to the spring by an increased delivery duct pressure in excess of a predetermined maximum, and means operated by such movement of said pressure sensitive means to decrease the intake to the blower, thereby, at the current blower speed, to decrease the pressure in such portion of the delivery duct.

8. Control mechanism for a blower having an intake thereto and a discharge duct therefrom, comprising a damper in the intake oscillatable about a transverse axis to control the amount of air admitted to the blower, a cylinder mounted upon the intake, offset from the damper, a piston reciprocable within the cylinder, and operatively connected to swing the damper, means operable to restrict the discharge duct and thereby to substantially throttle the blower's output, and correspondingly to increase the pressure in such discharge duct, a pressure connection from such blower discharge duct, intermediate the blower and said restrictive means, to the cylinder, so arranged that pressure in such portion of the discharge duct tends to move the piston in a direction to close the damper, and a spring opposing such movement of the piston, and affording an initial resistance, governing the pressure differential between such portion of the discharge duct and the intake.

9. An aircraft cabin supercharging system comprising, in combination, an engine-driven blower, an intake duct thereto from the atmosphere, a discharge duct conducting the entire blower output at all times to the cabin, cabin pressure automatic control mechanism operable to throttle said blower discharge duct to regulate the amount of air supplied to the cabin, thereby increasing the pressure in that portion of said discharge duct between said blower and said control mechanism, a normally open damper in the blower intake, a piston movable within a chamber, and operatively connected to effect movement of the damper, a pressure connection between the chamber and that portion of the blower discharge duct intermediate the blower and the cabin pressure control mechanism, to effect movement of the piston, and yieldable means to govern the pressure at which the piston moves the damper toward closed position, thereby to govern the maximum differential of pressure in such portion of the blower discharge duct over the blower intake duct.

10. Control mechanism for a blower having an inlet duct and a delivery duct, comprising a damper pivot disposed transversely of the inlet duct, a damper plate for restricting flow to the blower through the inlet duct pivoted thereon with one portion of such plate projecting generally radially from such pivot for a greater distance than the effective extent of the plate in the precisely opposite generally radial direction, the pressure difference in such inlet duct on opposite sides of said damper thereby urging such first damper plate portion toward alignment with the air flow through the duct with a force variable with such pressure difference, and damper operating means operable to move said damper toward closed position in opposition to the effect of such air flow.

11. Control mechanism for a blower having an inlet duct and a delivery duct, comprising a damper pivot disposed transversely of the inlet duct, a damper for restricting flow to the blower through the inlet duct mounted on said pivot and including a vane extending generally radially from one side of said pivot at an obtuse angle to a second vane extending generally radially from the opposite side of said pivot, such relative dispositio of said vanes enabling the pressure difference in such inlet duct on opposite sides of said damper to urge said damper toward open position with a force variable with such pressure difference, by the pressure differential acting on said two vanes being unequal, and resilient damper operating means operable to move said damper toward closed position in opposition to the effect of such air flow.

NATHAN C. PRICE.